No. 701,778. Patented June 3, 1902.
T. J. WADDELL.
FERTILIZER DISTRIBUTER.
(Application filed Oct. 12, 1901.)

(No Model.) 2 Sheets—Sheet 1.

Inventor
Thomas J. Waddell,

Witnesses

By Victor J. Evans
Attorney

No. 701,778. Patented June 3, 1902.
T. J. WADDELL.
FERTILIZER DISTRIBUTER.
(Application filed Oct. 12, 1901.)
(No Model.) 2 Sheets—Sheet 2.
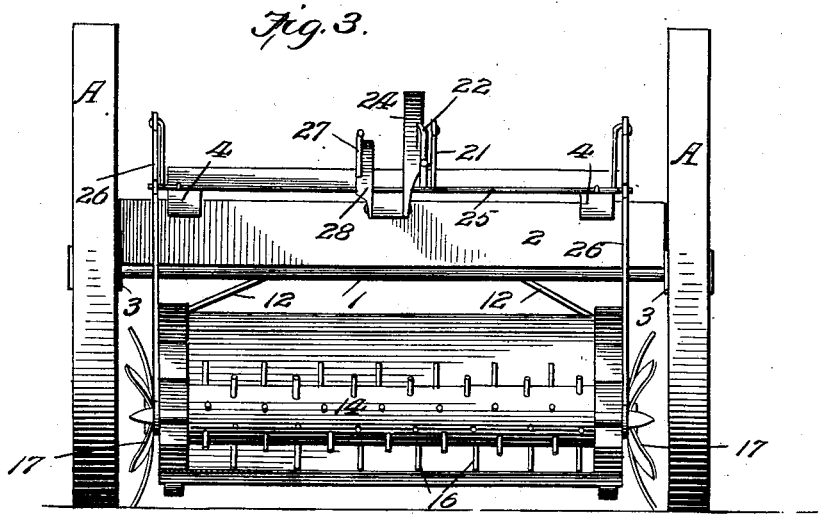
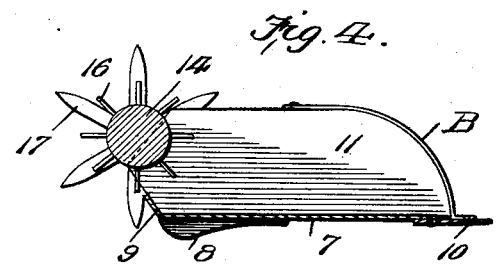
Witnesses
Inventor
Thomas J. Waddell
By Victor J. Evans
Attorney

UNITED STATES PATENT OFFICE.

THOMAS J. WADDELL, OF PHILBROOK, MONTANA.

FERTILIZER-DISTRIBUTER.

SPECIFICATION forming part of Letters Patent No. 701,778, dated June 3, 1902.

Application filed October 12, 1901. Serial No. 78,498. (No model.)

*To all whom it may concern:*

Be it known that I, THOMAS J. WADDELL, a citizen of the United States, residing at Philbrook, in the county of Fergus and State of Montana, have invented certain new and useful Improvements in Fertilizer-Distributers; and I do hereby declare the following to be a full, clear, and exact description of the invention, such as will enable others skilled in the art to which it appertains to make and use the same.

My invention has relation to improvements in fertilizer-distributers; and the objects are to simplify and improve the existing art by providing a machine of the kind named and for the purpose intended which is of simple construction and which may be adjusted or regulated to take on a load of material and to distribute it where and when required.

Another object is to provide improved means for regularly delivering the material over the surface.

With these objects in view the invention consists in the novel construction of parts and their arrangement and aggroupment in operative combination, as will be hereinafter fully described and then particularly pointed out and distinctly claimed.

I have fully and clearly illustrated my improvements in the accompanying drawings, forming a part of this specification, and wherein—

Figure 1:
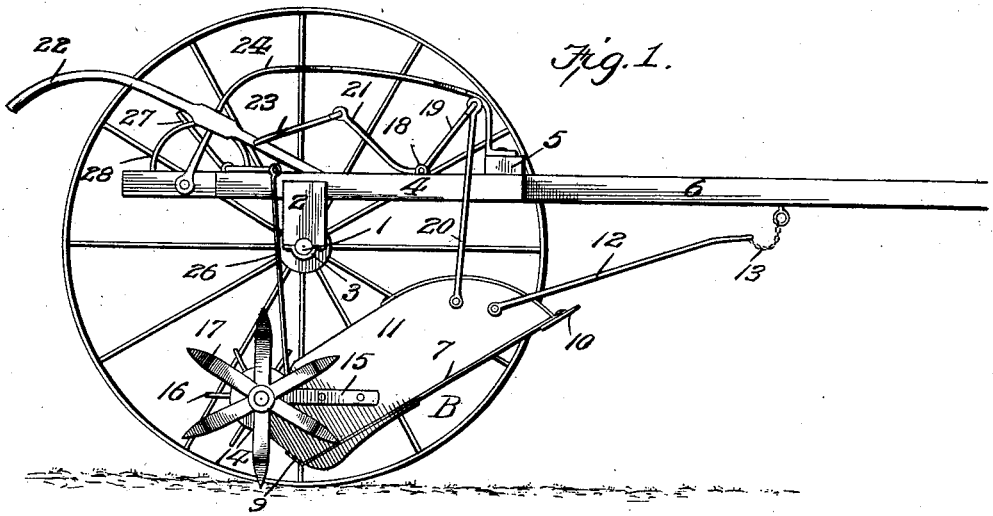
Figure 2:
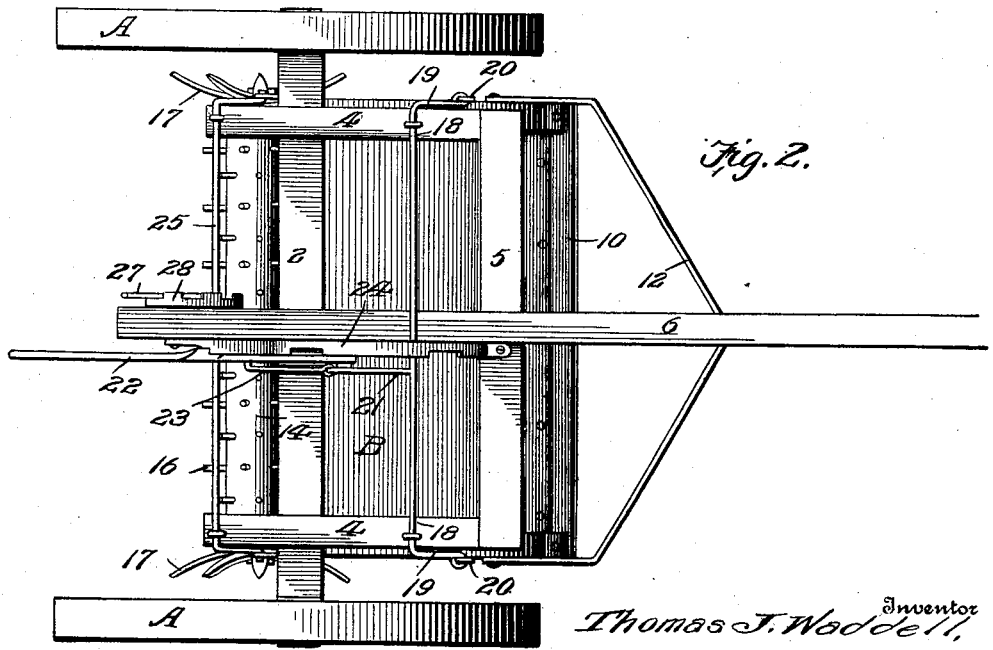

Figure 1 is a side view of the machine, showing the mechanism as in position for distributing the contents. Fig. 2 is a top plan view of the machine. Fig. 3 is a rear view in elevation of the machine, showing the delivering-roller and the star-wheels for imparting a shaking motion to the fertilizer-receptacle and scraper. Fig. 4 is a detail side view of the scraper, partly in section, with the roller and star-wheel.

Referring to the drawings, A designates the wheels, carried by an axle 1, on which is arranged a cross-piece 2, secured to the axle by means of keeper-straps or bearings 3. On the cross-piece 2 are laid and secured side bars 4 4, united at their front ends by a cross-piece 5. The frame thus constructed carries the mechanism and supports the means for manipulating and adjusting the scraper and manure-boat. A tongue 6 is provided by which the machine is pulled and guided.

B designates the scraper and manure-boat, constituting the receptacle into which the manure or fertilizer is gathered, transported, and delivered or distributed. This scraper and manure-boat is of such size and capacity as may adapt it to the purposes desired and consists of a flat bottom 7, provided with shoes or plates 8 along its sides, extending partially its length and made broader at their rear portions, as shown, so that the scraper will rest thereon in operation of gathering up the manure. The bottom of the scraper at the rear end is turned up, as at 9, to prevent the contents from escaping until desired. Across the front end of the bottom of the scraper is secured a scraper-bar 10. The scraper is provided with sides 11, having their rear ends slanting rearward and their front portions rounded down to the scraper-bar and protected by metal straps, substantially as shown in the drawings. At the front end of the scraper is hung a bail 12, having its outer portion connected to a chain 13, the other end of the chain being connected to a staple or eyebolt in the tongue of the machine. This flexible chain connection leaves the front end of the scraper free to accommodate itself to any and all adjustments by the lever. At the rear end of the boat or scraper, approximately at the upper corners of the sides, is arranged a distributing-roller 14, having journals arranged in and extending through bearings made in the outer ends of metal strips 15, secured to the sides of the scraper. In the perimeter of the roller 14 are rows of spirally-placed pins 16, the ends of which clear the edge of the inclined end piece 9 and engage with the material in the scraper and deliver it in regular distribution to the soil. On the extending ends of the journals of the roller 14 are mounted spiders or star-wheels 17, constituting the means for imparting a jarring and shaking motion to the scraper, and thereby keeping the material in a loose condition.

Adjacent to the front end of the frame is pivotally mounted a bar 18, having its end turned down, as at 19, and connected to the upper ends of links 20, which have their lower ends pivotally connected to the sides of the scraper. To the bar 18 is rigidly secured an arm 21, the outer end of which is connected to a link 23, suitably connected to a lever 22. A bar 24, with notches in its edge, is secured on the frame, the lever 22 engaging with the notches and holding the front end of the scraper in such position as may be desired. At the rear end of the frame is pivotally mounted a bar 25, having its ends turned down, as shown, forming arms, to the free ends of which are connected links or bars 26, the lower ends of which are suitably connected to the sides of the scraper adjacent to the rear end thereof. At a convenient point in the bar 25 is rigidly fixed a lever-arm 27, by which the bar is turned in its bearings to raise and lower the rear end of the scraper, and to hold the scraper in such position the lever-arm 27 engages in notches in a curved bar 28 in a well-known manner. A driver's seat (not shown) may be mounted on the frame convenient to the levers.

From the foregoing description, taken in connection with the drawings, it will be perceived that the scraper may be adjusted in suspension to any required positions. It may be lowered to substantially horizontal position or so it will hang at any height required, and so carried from the corral to the field. It may be tilted in either direction—that is, with the scraper end on the ground and the rear end raised or the rear end lower than the front end.

The operation may be stated as follows: Preparatory to taking a load in the scraper it is lowered so as to run comparatively with the edge of the scraper-bar engaging the manure or compost, and then the machine is pulled forward and the scraper filled. The scraper is then raised and the machine drawn to the field, where the rear end of the scraper is lowered until the star-wheels engage the ground and the front end is raised to the proper height, when by drawing the machine forward the contents slide by gravity down against the revolving roller and are delivered to the soil thoroughly broken and substantially comminuted.

What I claim is—

1. The combination with the scraper, of a toothed roller journaled across the rear end of the scraper, and star-wheels mounted on the journals of the roller to rotate it.

2. In a fertilizer-distributer, the combination with a suitable wheeled support, of a scraper adjustably and independently supported at each end, levers to raise, lower, and tilt the scraper, a toothed roller journaled at the rear end of the scraper, and star-wheels on the journals thereof to turn the rollers.

3. In a fertilizer-distributer, the combination with a wheeled supporting-frame, of a scraper, a toothed roller journaled at the rear end of the scraper, star-wheels on the journals thereof, suspension-bars at the front end of the scraper, a lever to raise and lower the said bars, suspension-bars at the rear end of the scraper, and a lever to raise and lower the said bars.

In testimony whereof I affix my signature in presence of two witnesses.

THOMAS J. WADDELL.

Witnesses:
ERVIN R. JUDD,
O. T. JACOBSON.